(12) United States Patent
Steltz et al.

(10) Patent No.: US 8,875,816 B2
(45) Date of Patent: Nov. 4, 2014

(54) HIGH TRAVEL SUSPENSION FOR SMALL GROUND MOBILE ROBOTS

(71) Applicant: iRobot Corporation, Bedford, MA (US)

(72) Inventors: Erik E. Steltz, Melrose, MA (US); Jeffrey L. Weeks, South Easton, MA (US); Lee Sword, Hollis, NH (US); Annan Michael Mozeika, Groton, MA (US)

(73) Assignee: iRobot Corporation, Bedford, MA (US)

( * ) Notice: Subject to any disclaimer, the term of this patent is extended or adjusted under 35 U.S.C. 154(b) by 14 days.

(21) Appl. No.: 13/828,484

(22) Filed: Mar. 14, 2013

(65) Prior Publication Data

US 2014/0138168 A1    May 22, 2014

Related U.S. Application Data

(60) Provisional application No. 61/613,304, filed on Mar. 20, 2012.

(51) Int. Cl.
*B62D 55/104* (2006.01)
*B25J 5/00* (2006.01)

(52) U.S. Cl.
CPC .............. *B25J 5/005* (2013.01); *B62D 55/104* (2013.01); *Y10S 901/01* (2013.01)
USPC ................ 180/9.5; 180/6.54; 305/133; 901/1

(58) Field of Classification Search
USPC ......... 180/6.54, 9.5, 9.21, 9.32, 9.1; 305/132, 305/133; 901/1
See application file for complete search history.

(56) References Cited

U.S. PATENT DOCUMENTS

| | | | | | |
|---|---|---|---|---|---|
| 1,393,157 | A | * | 10/1921 | Ollivier | 305/133 |
| 2,321,874 | A | * | 6/1943 | Tandler et al. | 180/6.7 |
| 2,859,045 | A | * | 11/1958 | Beaufort et al. | 280/43 |
| 3,452,702 | A | * | 7/1969 | Slemmons | 440/12.63 |
| 4,483,407 | A | * | 11/1984 | Iwamoto et al. | 180/9.5 |
| 4,702,843 | A | * | 10/1987 | Oswald et al. | 280/5.507 |
| 7,600,592 | B2 | * | 10/2009 | Goldenberg et al. | 180/9.1 |
| 2006/0254832 | A1 | * | 11/2006 | Strong | 180/9.5 |
| 2014/0138169 | A1 | * | 5/2014 | Fairhead | 180/9.5 |

* cited by examiner

*Primary Examiner* — Tony Winner
(74) *Attorney, Agent, or Firm* — Myers Bigel Sibley & Sajovec, PA (57) ABSTRACT

A lightweight mobile robot includes a chassis less than 500 pounds and two independent tracked drives including a drive wheel assembly, four or more independently suspended bogie assemblies, an idler wheel assembly, a compliant front shoe fixedly coupled to an independently suspended bogie assembly positioned adjacent the idler wheel assembly, and a compliant elastomer track entraining the drive wheel, road wheels, idler wheel assembly and compliant front shoe. The bogie assembly includes a serpentine suspension arm having a corresponding road wheel rotatably mounted at a distal end thereof, the bogie arm swingable through a range entirely beneath the chassis. The serpentine suspension arm provides clearance for adjacent road wheels to swing past one another without making contact with any portion of the adjacent bogie assembly. The compliant elastomer track has center guides and peripheral drive features protruding therefrom for engaging the drive wheel, road wheels, and idler wheel.

20 Claims, 8 Drawing Sheets

PRIOR ART

HIGH TRAVEL SUSPENSION FOR SMALL GROUND MOBILE ROBOTS

RELATED APPLICATIONS

This application claims priority from U.S. Provisional Application No. 61/613,304, filed Mar. 20, 2012, the disclosure of which is hereby incorporated herein in its entirety.

GOVERNMENT LICENSE RIGHTS

This invention was made with government support under Contract Number W911NF-10-C-0079 awarded by DARPA. The government has certain rights in the invention.

FIELD OF THE INVENTION

The currently described invention relates to high travel suspension for small ground robots, particularly lightweight robots conforming to rough terrain.

BACKGROUND

Existing small, lightweight mobile ground robots have no suspension or minimal suspension that is inadequate for conforming to rough terrain. Lightweight robots (e.g., robots less than 500 lbs) do not employ suspension systems, and the ground contact patch between the track and ground is too small to provide adequate traction. Without sufficient conformance, existing robots are unable to achieve a level of traction and mobility sufficient for preventing sideways slipping and backwards sliding in uneven and often steep ground environments. Furthermore, existing robot suspension systems fail to address surmounting environmental obstacles on scale or bigger than the robot. Unlike heavy tanks with steel tracks and ground pressure on the order of 14 psi, small ground robots having ground pressure of less than 1 psi are unable to pulverize material or overcome rough ground terrain as their larger counterparts do with the aid of powerful turbine engine propulsion.

A need therefore exists for improved suspension systems for enabling a small ground robot to navigate rough terrain successfully without deviating from a desired line of travel and without damaging the robot or sensitive payloads thereon.

SUMMARY

According to a first aspect, embodiments of the invention are directed to a lightweight mobile robot having a chassis less than 500 pounds and two independent tracked drives, one each disposed on an opposing side of the chassis. The two independent tracked drives each have a height and length, and include a drive wheel assembly at a rear top of the tracked drive. The drive wheel assembly includes a drive wheel, and a drive motor for driving the drive wheel. In some embodiments of the lightweight mobile robot, the drive wheel has a diameter that is equal to or greater than half the height of the independent tracked drives.

The two independent tracked drives each have four or more independently suspended bogie assemblies at a center bottom of the tracked drive. Each bogie assembly includes a road wheel, and a bogie suspension arm with the road wheel rotatably mounted at a distal end thereof. The bogie suspension arm is swingable through a vertical range of more than one quarter to one half, and in some embodiments one third, of the tracked drive height. The bogie suspension arm has a serpentine curvature that offsets the corresponding road wheel outwardly from the chassis by a distance at least equal to a length of a longitudinal central axis of the road wheel. An inflection point of the bogie suspension arm is positioned at a distance along a length of the suspension arm greater than a radius of the road wheel, thereby providing clearance for adjacent road wheels to swing past one another without making contact with any portion of the adjacent bogie assembly. The bogie assembly also has a shock absorber mounted to independently compress the bogie arm.

The lightweight mobile robot has an idler wheel assembly at a front top of each tracked drive. The idler wheel assembly includes an idler wheel, and a linearly translating idler wheel arm with the idler wheel rotatably mounted at a distal end thereof. The lightweight mobile robot includes a compliant elastomer track entraining the drive wheel, the road wheels, and the idler wheel. The elastomer track has two peripheral rows of raised drive features flanking a row of guide horns protruding from an inwardly facing track surface for matably engaging with the drive wheels, the road wheels and the idler wheel. The elastomer track is mounted with a tension. In some embodiments, the elastomer track is an injection molded, unitary component. In some embodiments, the elastomer track is mounted with a tension between 1 and 10 pounds.

The lightweight mobile robot includes a compliant front shoe fixedly coupled to a bogie suspension arm and shock absorber disposed at a front of the chassis and in communication with the road wheel adjacent the idler wheel. The compliant front shoe is centered about the central guide horns and is disposed substantially equidistantly between the idler wheel and adjacent road wheel. In some embodiments, the compliant shoe is manufactured from oil impregnated nylon. In some embodiments of the lightweight mobile robot, the guide horn height is at least half a radial distance to a center of a road wheel. In some embodiments of the lightweight mobile robot, the guide horn height is about two thirds a radial distance to a center of a road wheel.

The lightweight mobile robot optionally includes an adjustable shock mount coupled to a proximal end of a respective bogie suspension arm and the corresponding shock absorber such that the bogie suspension arm is positioned between the shock absorber and the chassis.

In some embodiments of the lightweight mobile robot, the shock absorber of each bogie assembly is preloaded according to a position of the bogie assembly along a length of the chassis relative to the drive wheel position. In some embodiments, the shock absorber of the bogie assembly adjacent the drive wheel is the most stiff of the at least four bogie assemblies and the shock absorbers of the at least two bogie assemblies located centrally along the length of the chassis are the least stiff of the at least four bogie assemblies.

According to a second aspect, embodiments of the invention are directed to a compliant track suspension assembly for a mobile robot having a chassis and at least one tracked drive having a tracked drive height and a tracked drive length disposed on the chassis. The compliant track suspension assembly includes four or more independently suspended bogie assemblies at a center bottom of the tracked drive. Each bogie assembly includes a road wheel, and a bogie suspension arm having the road wheel rotatably mounted at a distal end thereof. The bogie suspension arm is swingable through a vertical range of more than one quarter to one half, and in some embodiments one third, of the tracked drive height. The bogie suspension arm has a serpentine curvature that laterally spaces the corresponding road wheel apart from the chassis by a distance at least equal to a width of the road wheel. The bogie assembly includes a shock absorber mounted to independently compress the bogie arm.

The compliant track suspension assembly also includes an idler wheel assembly at a front top of the tracked drive. The idler wheel assembly has an idler wheel, and a linearly translating idler wheel arm with the idler wheel rotatably mounted at a distal end thereof.

The compliant track suspension assembly includes a compliant elastomer track entraining the road wheels and the idler wheel, wherein the elastomer track is mounted with a tension.

The compliant track suspension assembly includes a compliant front shoe fixedly coupled to the front bogie suspension arm and shock absorber in communication with the road wheel adjacent the idler wheel. The compliant front shoe is disposed substantially equidistantly between the idler wheel and adjacent road wheel.

In some embodiments, the mobile robot weighs less than 500 lbs.

In some embodiments, the compliant track suspension assembly further includes a drive wheel assembly at a rear top of the tracked drive entrained within the compliant elastomer track. The drive wheel assembly includes a drive wheel, and a drive motor for driving the drive wheel.

In some embodiments, the compliant elastomer track further includes two peripheral rows of raised drive features flanking a row of guide horns protruding from an inwardly facing track surface for matably engaging with the drive wheels, the road wheels and the idler wheel. In some embodiments, a height of the guide horns is greater than a height of the raised drive features by a factor of at least two. In some embodiments, the compliant front shoe is centered about the central guide horns.

In some embodiments of the compliant track suspension assembly, an inflection point of the bogie suspension arm is positioned at a distance along a length of the suspension arm greater than a radius of the corresponding road wheel, with the distance being measured from the distal end of the bogie suspension arm.

According to a third aspect, embodiments of the invention are directed to a lightweight mobile robot having a chassis less than about 500 pounds and two independent tracked drives, one each disposed on an opposing side of the chassis. Each tracked drive has a tracked drive height and a tracked drive length. Each tracked drive includes a drive wheel assembly at a rear top portion of the tracked drive. The drive wheel assembly includes a drive wheel and a drive motor for driving the drive when.

Each tracked drive includes four or more independently suspended bogie assemblies in a center bottom portion of the tracked drive. Each bogie assembly includes a bogie suspension arm with the road wheel rotatably mounted at a distal end thereof. The bogie arm is swingable through a vertical range of at least one quarter of the tracked drive height. The bogie suspension arm has a serpentine curvature offsetting the corresponding road wheel outwardly from the chassis, thereby providing clearance for adjacent road wheels to swing past one another without making contact with any portion of the adjacent bogie assembly. Each bogie assembly includes a shock absorber coupled to the bogie suspension arm to independently compress the bogie suspension arm.

Each tracked drive includes an idler wheel assembly at a front top portion of the tracked drive. The idler wheel assembly includes an idler wheel and a linearly translating idler wheel arm with the idler wheel rotatably mounted at a distal end thereof.

Each tracked drive includes a compliant elastomeric track entraining the drive wheel, the road wheels, and the idler wheel. The elastomeric track includes two outer rows of raised drive features and a row of guide horns disposed between the outer rows of raised drive features. The raised drive features and the guide horns protrude from an inner track surface of the elastomeric track. The guide horns are configured to matably engage the drive wheel, the road wheels and the idler wheel. The elastomeric track is mounted with a tension.

Each tracked drive includes a compliant front shoe coupled to a bogie suspension arm and shock absorber disposed at a front of the chassis and in communication with the road wheel adjacent the idler wheel. The compliant front shoe has a slot configured to receive the central guide horns such that the front shoe is substantially centered about the central guide horns, wherein the front shoe is disposed between the idler wheel and adjacent road wheel.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions and in the accompanying drawings, in which.

DETAILED DESCRIPTION OF ILLUSTRATIVE EMBODIMENTS

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

As used herein, the term "about" used in connection with a recited (e.g., claimed) value means+/−10% or +/−20% of the claimed value in various embodiments.

Embodiments of the present invention provide high travel suspension for small ground robots. The suspension allows ground robots to conform to terrain, thereby achieving traction and mobility over rough (especially steep) terrain as compared to robots of similar size having high tension tracks and little or no suspension. This advantage is especially important in steep, rocky environments where rigid suspensions on ground robots fail by slipping and sliding backwards. Because these robots are small, many obstacles in the environment are on scale with or bigger than the robot. The suspension therefore could not simply scale a tank suspension. For example, an M1 tank only has approximately 12 inches of road wheel travel for a vehicle that is many feet tall. Exemplary suspensions of the present invention have 4 inches of travel for a vehicle that is only 11 inches tall.

Other advantages of embodiments of the present invention include allowing a small ground robot to navigate rough terrain heretofore unobtainable via stiff suspension. Embodiments of the present invention allow the small ground robot to travel much faster than comparably sized robots over rough terrain without damage to the robot or sensitive payloads. Embodiments of the present invention reduce cognitive load on an operator (i.e., enabling simply steering forward rather than steering around obstacles). Embodiments of the present invention smooth out the ride of the robot at all speeds, thereby reducing deleterious effects such as, for example, camera blur, accelerations, shock and vibe. These latter advantages are particularly important for sensitive sensors mounted on the robot.

Figure 1A:
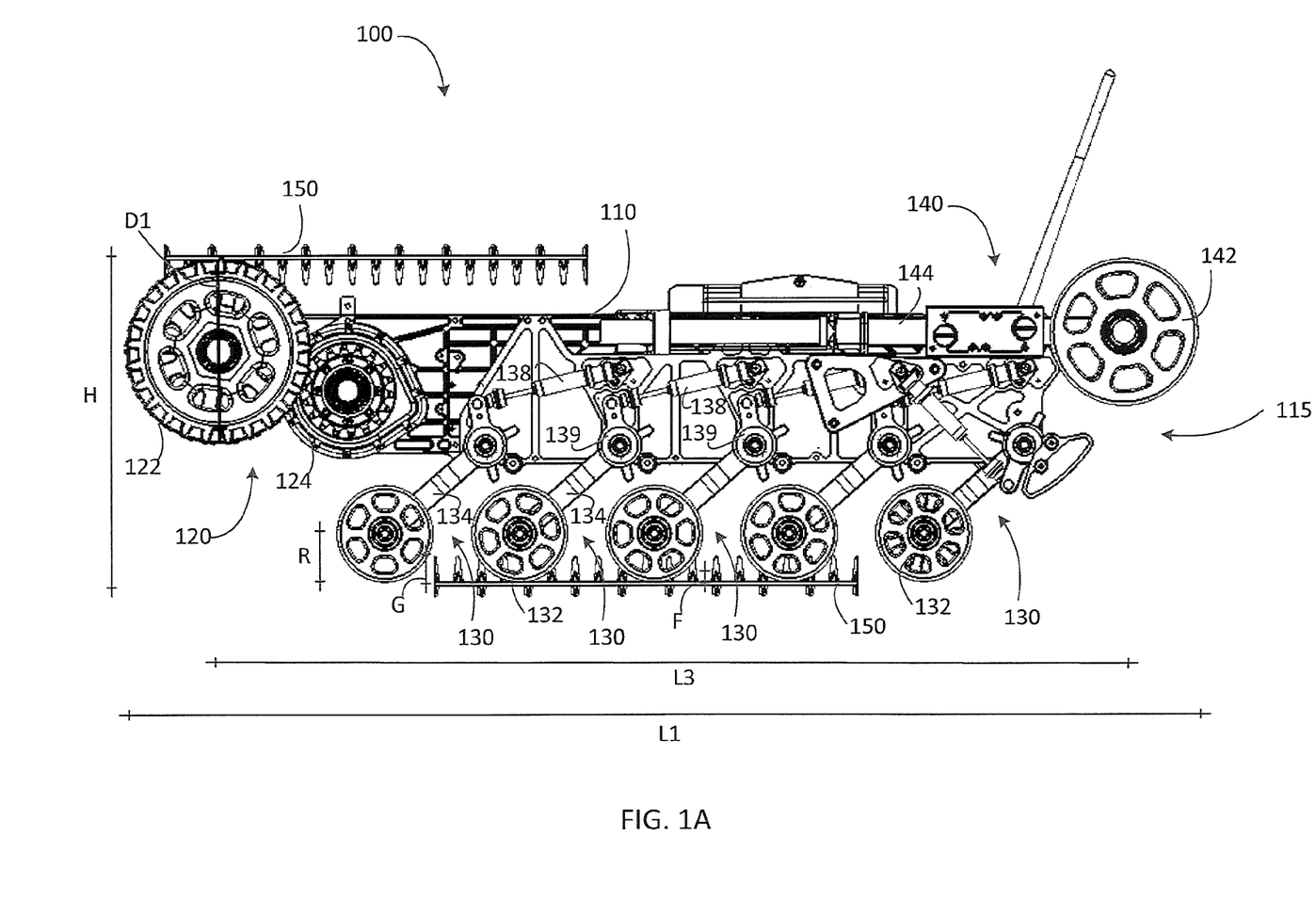
FIG. 1A is a schematic illustration of a side view of a small ground mobile robot, according to some embodiments.
Figure 1B:
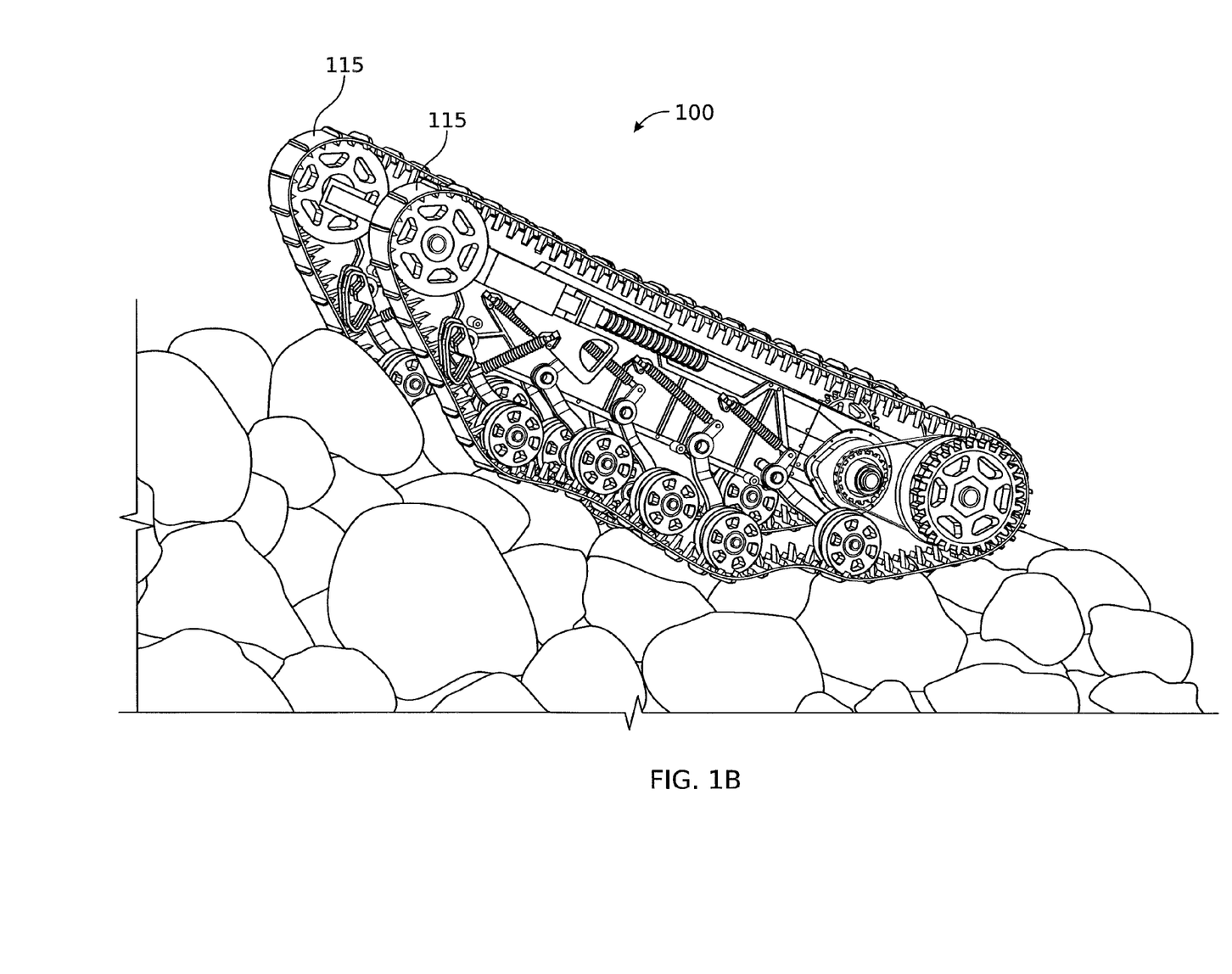
FIG. 1B is a perspective side view of the small ground mobile robot of FIG. 1A.

Turning now to FIGS. 1A and 1B, a lightweight mobile robot 100 according to some embodiments includes a chassis 110 weighing less than 500 pounds, and two independent tracked drives 115, only one of which is partially shown in FIG. 1A. The two independent tracked drives 115 are disposed on either side of the chassis and are mirror images of one another. As indicated in FIG. 1A, each tracked drive 115 has a height H and length L1. Each tracked drive 115 includes a drive wheel assembly 120 at a rear top of the tracked drive 115 (as viewed from the side of the robot 100 as in FIG. 1A). The drive wheel assembly 120 includes a drive wheel 122, and a drive motor 124 driving the drive wheel 122. In some embodiments, the diameter D1 of the drive wheel 122 is equal to or greater than half the height H of the tracked drive 115. The tracked drive 115 also includes four or more independently suspended bogie assemblies 130 in a center bottom of the tracked drive 115 (again, as viewed from the side of the robot 100 as in FIG. 1A).

Figure 2:
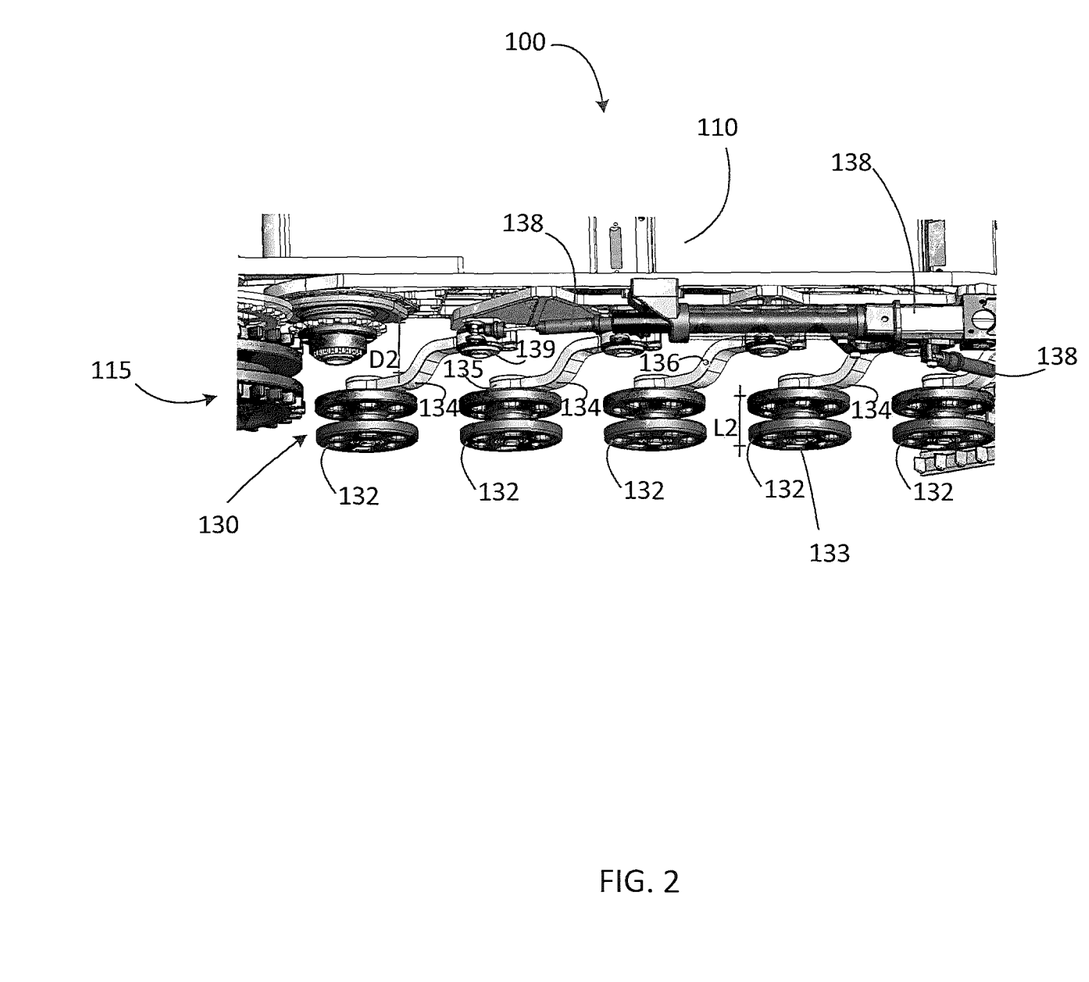
FIG. 2 is a schematic illustration of a top perspective view illustrating bogie wheel assemblies of the small ground mobile robot of FIG. 1A according to some embodiments.
Figure 6:
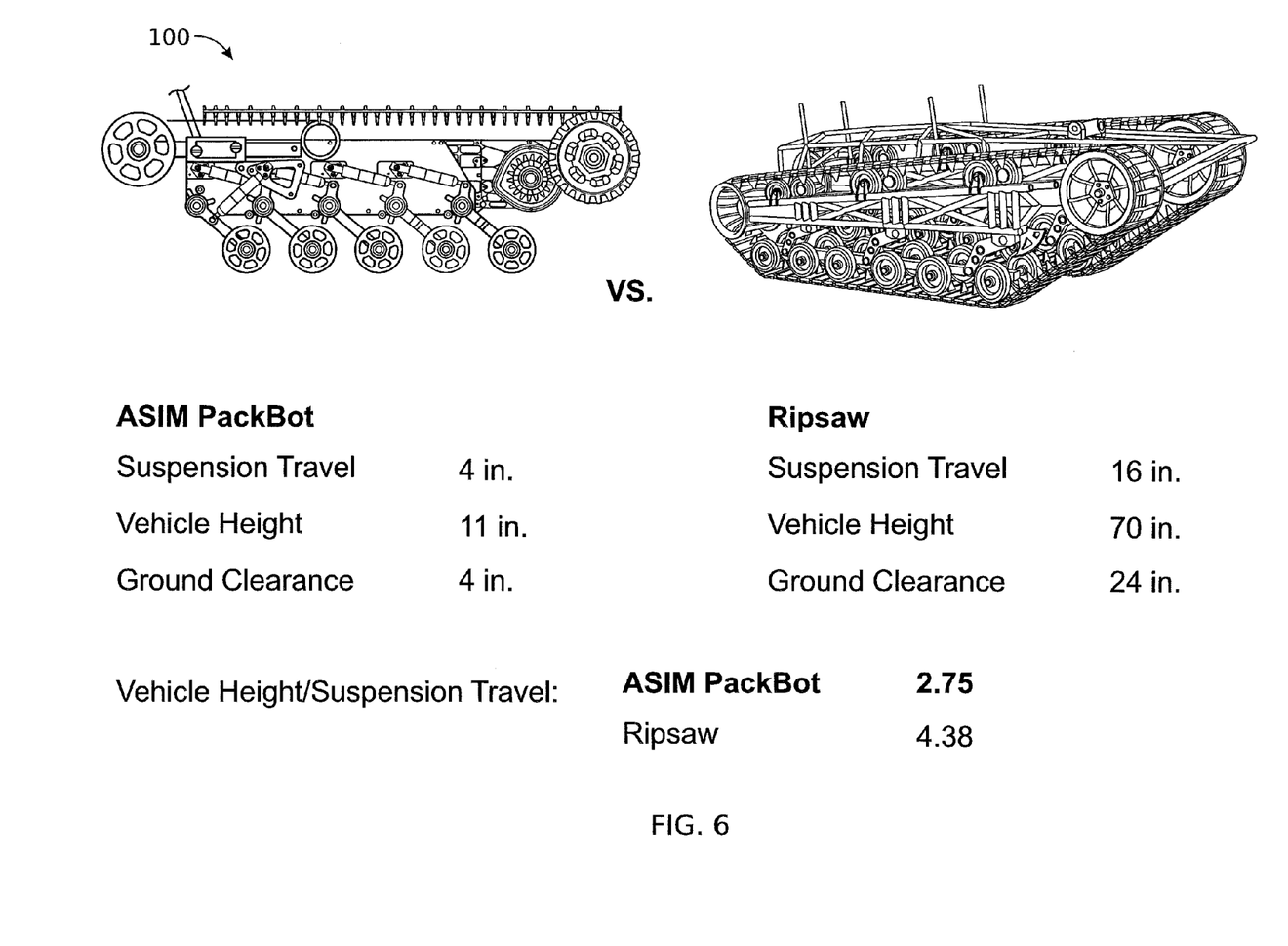
FIG. 6 is a depiction of tabulated data comparing the compliant suspension of a small ground mobile robot according to some embodiments of the invention to a prior art tank-like device.

As depicted in FIG. 2, each bogie assembly 130 includes a road wheel 132 and a bogie suspension arm 134 with the corresponding road wheel 132 rotatably mounted at a distal end 135 thereof. In various embodiments, the bogie suspension arm 134 is swingable through a vertical range of more than one quarter to one half, and preferably at least about one third, of the tracked drive height H. In some embodiments, for example the one depicted in FIG. 6, the bogie assembly 130 of a robot 100 having an 11 inch vertical height travels four inches, one inch vertically downward and three inches vertically upward from a "rest" position, thereby having a Vertical Height/Suspension ratio of 11:4 or 2.75. Returning to FIGS. 1A and 2, the bogie suspension arm 134 has a serpentine, or S-shaped, curvature offsetting the corresponding road wheel 132 outwardly from the chassis 110 by a distance D2 at least equal to the length L2 of the longitudinal central axis 133 of the road wheel 132 (i.e., a width of the road wheel 132). In some embodiments, an inflection point 136 of the bogie suspension arm 134 is positioned at a distance along the length of the suspension arm 134 greater than the radius R of a road wheel. In some embodiments, the bogie suspension arm is a flat plate bent around an inflection point to form an S-shape.

The serpentine curvature of the bogie suspension arm 134 holds the road wheel 132 apart from the chassis 110 and provides clearance for adjacent road wheels 132 to swing past one another without making contact with any portion of the adjacent bogie assembly 130. In other words, adjacent road wheels 132 swing upward aside the chassis 110 and/or swing downward and therefore sometimes move past one another such that one road wheel 132 is positioned above an adjacent road wheel 132. The S-shaped bogie suspension arms 134 enable this movement while preventing two independently suspending, swinging road wheels 132 from colliding with each other or contacting the chassis 110. Each bogie assembly 130 further includes a shock absorber 138 mounted to independently compress the bogie suspension arm 134. In some embodiments, the lightweight mobile robot 100 further includes an adjustable shock mount 139 coupled to a proximal end of the bogie suspension arm 134 and the shock absorber 138 such that the bogie suspension arm 134 is positioned between the adjustable shock mount 139 and the chassis 110. In some embodiments, the shock absorber 138 is a spring over damper shock absorber.

Returning to FIG. 1A, the lightweight mobile robot 100 as illustrated includes an idler wheel assembly 140 at a front top of each tracked drive 115 (again, as viewed from the side of the robot 100 as in FIG. 1A). The idler wheel assembly 140 includes an idler wheel 142 and a linearly translating idler wheel arm 144 with the idler wheel 142 rotatably mounted at a distal end thereof. The lightweight mobile robot 100 includes a compliant elastomer track 150 entraining the drive wheel 122, road wheels 132, and the idler wheel 142. Although the compliant elastomer track 150 is depicted only partially in FIG. 1A, the elastomer track 150 may be an injection molded, unitary component that completely encircles the drive wheel 122, road wheels 132, and the idler wheel 142.

Figure 3A:
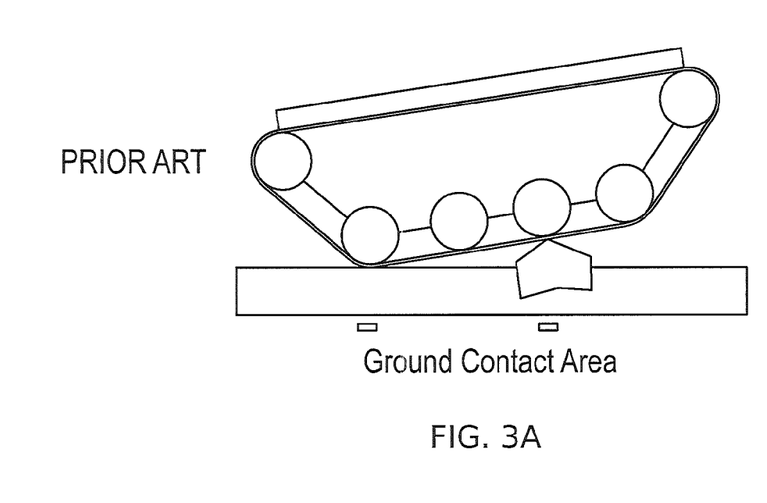
FIG. 3A is a schematic illustration of a prior art, non-compliant small ground mobile robot track.
Figure 3B:
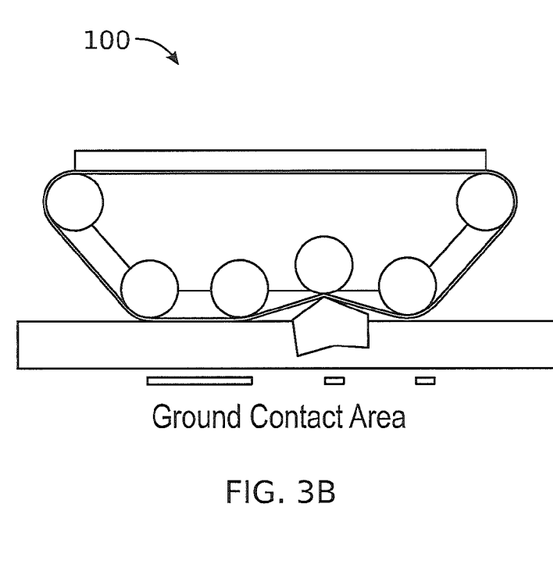
FIG. 3B is a schematic illustration of a compliant small ground mobile robot suspension, according to some embodiments.

The elastomer track 150 is mounted with a tension between 1 and 10 pounds, and preferably about 5 pounds. This amount of tension is very small compared to the 30 pounds of tension applied to robots of similar size having no or limited suspension assemblies. The extremely low tension in the compliant elastomer track 150 of the present invention enables the lightweight mobile robot 100 to conform to uneven ground, which is particularly useful for traversing uneven terrain on a steep slope. As depicted in FIG. 3B, this enables the elastomer track 150 to conform to ground terrain and provides larger ground contact areas than tracks that are highly tensioned, such as the prior art track depicted in FIG. 3A.

Figure 4A:
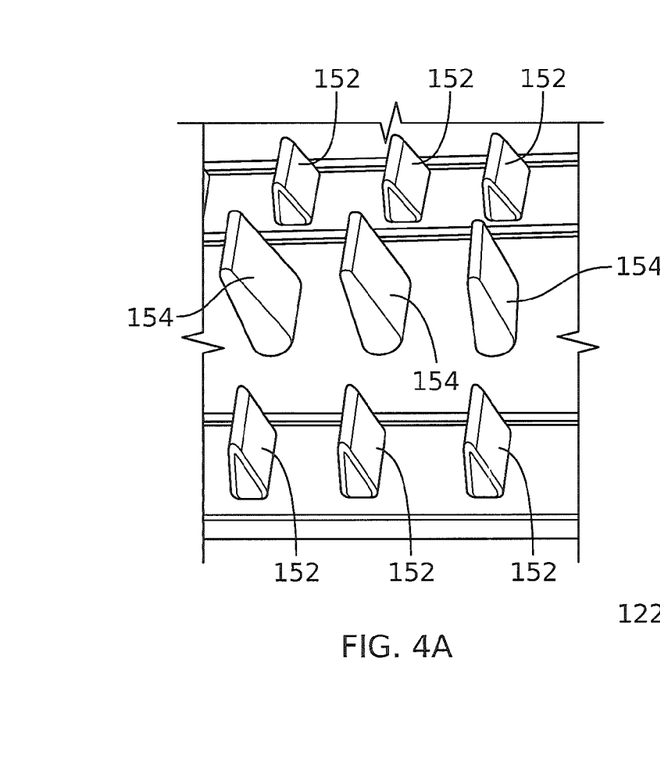
FIG. 4A is a top perspective view of a portion of compliant elastomer track portion of a compliant suspension of the small ground mobile robot of FIG. 1A according some embodiments.
Figure 4B:
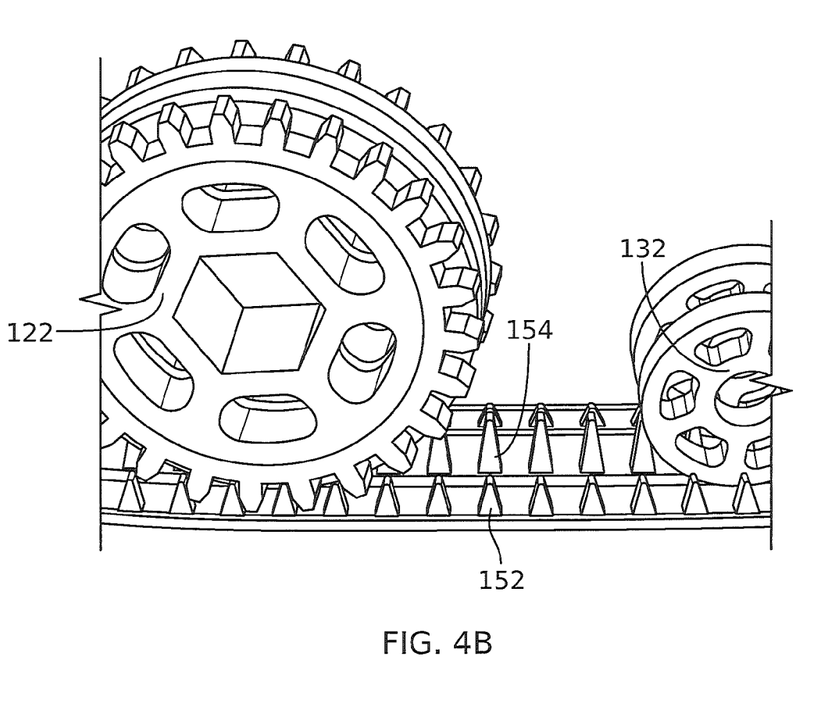
FIG. 4B is a top perspective view of a portion of compliant elastomer track portion of FIG. 4A of a compliant suspension of small ground mobile robot engaged with a drive wheel and road wheel, according to some embodiments.

Turning to FIGS. 4A and 4B, to prevent detracking, an inner surface of the elastomer track 150, in some embodiments, has protruding therefrom two peripheral rows of raised drive features 152 flanking a centered row of guide horns 154, or center guides. The raised drive features 152 and centered row of guide horns 154 protrude from the inwardly facing track surface for matably engaging with the drive wheels 122, road wheels 132, idler wheel 142, and a front shoe 160 discussed below in reference to FIGS. 5A and 5B. As depicted in FIG. 1A, in some embodiments, the height G of the guide horn 154 is at least half the radius R of a road wheel 132. In some embodiments, the height G of the guide horn 154 is two thirds the radius R of a road wheel 132 or about two thirds the radius R of a road wheel 132. In some embodiments, the height G of the guide horn 154 is greater than the height F of the raised drive features 152 by a factor of at least two. The elastomer track 150 stretches and compresses to accommodate and release lose debris that may temporarily lodge between the track 150 and the road wheels 132, idler wheel 142 and drive wheel 122.

To accommodate uneven terrain presenting obstacles (e.g., rocks, logs, ledges, etc.) that are often on scale with or larger than the lightweight mobile robot 100, the bogie assemblies 130 are independently suspended and each includes a shock absorber 138, and the idler wheel 142 is mounted to the linearly translating idler wheel arm 144. The linearly translating idler wheel arm 144 may be, for example, but not limited to, a spring or spring and damper configuration. The translation of the translating idler wheel arm 144 contains enough travel range to completely feed in or take out the slack or excess tension in the compliant elastomer track 150 when the elastomer track 150 conforms to an obstacle. In some embodiments, the linearly translating idler wheel arm 144 travels through a range of 2-6 inches or about 2 to about 6 inches. The idler wheel 142 therefore also functions as a bumper when driven directly into a tall obstacle because the translating idler wheel arm 144 accommodates contact with the obstruction.

In some embodiments, the shock absorbers 138 and linearly translating idler wheel arm 144 are preloaded. In some embodiments, each of the shock absorbers 138 is preloaded according to the position of the bogie assembly 130 along the length L3 of the chassis 110 relative to the position of the drive wheel 122. In some embodiments, the shock absorber 138 of the bogie assembly 130 adjacent or closest to the drive wheel 122 is the stiffest of the at least four bogie assemblies 130 and one or more bogie assemblies 130 located centrally along the length L3 of the chassis 110 are the least stiff of the bogie assemblies 130. The bogie assembly 130 adjacent or closest to the idler wheel 142 has a relative stiffness between that of the most stiff and least stiff bogie assemblies.

Figure 5A:
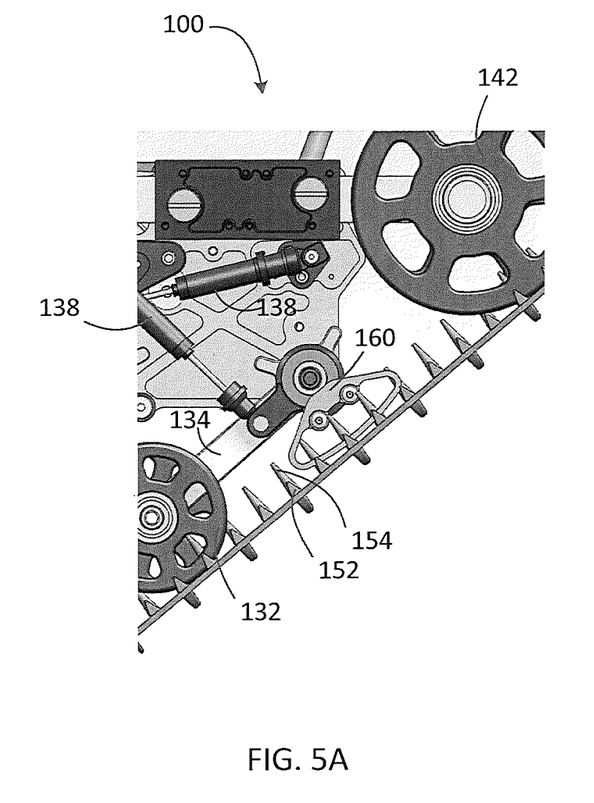
FIG. 5A is a schematic illustration of a side view of a compliant front shoe portion of a compliant suspension of the small ground mobile robot of FIG. 1A according to some embodiments.
Figure 5B:
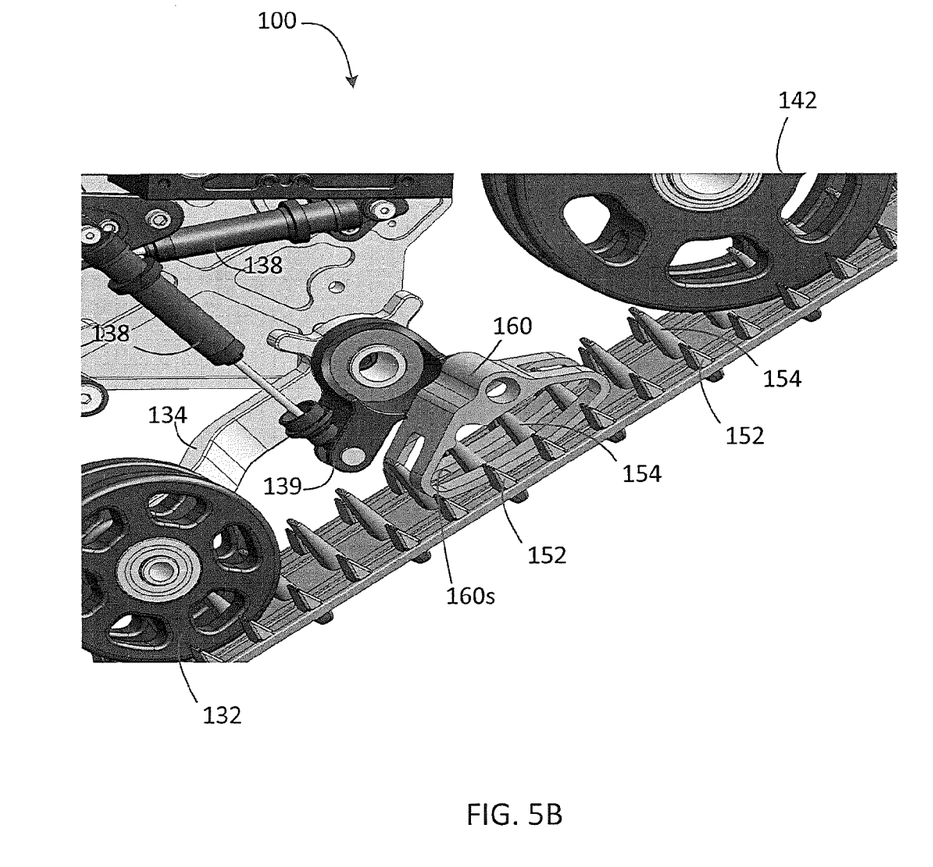
FIG. 5B is a schematic illustration of a perspective side view of a compliant front shoe portion of a compliant suspension of the small ground mobile robot of FIG. 1A according to some embodiments.

Turning to FIGS. 5A and 5B, as illustrated, the lightweight mobile robot 100 comprises a compliant front shoe 160 fixedly coupled to an adjustable shock mount 139 of the shock absorber 138 and front bogie suspension arm 134 in communication with the road wheel 132 directly adjacent or closest to the idler wheel 142. In the depicted embodiment, the compliant front shoe 160 is centered about the central guide horns 154 and disposed substantially equidistantly between the idler wheel 142 and adjacent road wheel 132. In some embodiments, the front shoe 160 includes a slot 160s configured to receive the central guide horns 154. In some embodiments, the compliant shoe 160 is manufactured from oil impregnated nylon. The compliant front shoe 160 absorbs the force of an obstacle taller than the road wheel 132 directly adjacent or closest to the idler wheel 142, and upon impact with such an obstacle, the compliant shoe 160 raises the height of the adjacent road wheel 132 so that the lightweight mobile robot 100 surmounts the obstacle rather than merely abutting the obstacle without overcoming the same.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A lightweight mobile robot, comprising:
   (a) a chassis less than 500 pounds; and (b) two independent tracked drives, one each disposed on an opposing side of the chassis, each tracked drive having a height and length, each tracked drive including:
  (i) a drive wheel assembly at a rear top of the tracked drive, the drive wheel assembly including:
    a drive wheel, and
    a drive motor for driving the drive wheel;
  (ii) at least four independently suspended bogie assemblies at a center bottom of the tracked drive, each bogie assembly including:
    a road wheel,
    a bogie suspension arm with the road wheel rotatably mounted at a distal end thereof, the bogie arm swingable through a vertical range of more than one quarter to one half of the tracked drive height, the bogie suspension arm having a serpentine curvature offsetting the corresponding road wheel outwardly from the chassis by a distance at least equal to a length of a longitudinal central axis of the road wheel, an inflection point of the bogie suspension arm positioned at a distance along a length of the suspension arm greater than a radius of the road wheel, thereby providing clearance for adjacent road wheels to swing past one another without making contact with any portion of the adjacent bogie assembly, and
    a shock absorber mounted to independently compress the bogie suspension arm;
  (iii) an idler wheel assembly at a front top of the tracked drive, the idler wheel assembly including:
    an idler wheel, and
    a linearly translating idler wheel arm with the idler wheel rotatably mounted at a distal end thereof;
  (iv) a compliant elastomer track entraining the drive wheel, the road wheels, and the idler wheel, the elastomer track having two peripheral rows of raised drive features flanking a row of guide horns protruding from an inwardly facing track surface for matably engaging with the drive wheel, the road wheels and the idler wheel, wherein the elastomer track is mounted with a tension; and
  (v) a compliant front shoe fixedly coupled to a bogie suspension arm and shock absorber disposed at a front of the chassis and in communication with the road wheel adjacent the idler wheel, the compliant front shoe being centered about the central guide horns and disposed substantially equidistantly between the idler wheel and adjacent road wheel.

2. The lightweight mobile robot of claim 1, further comprising an adjustable shock mount coupled to a proximal end of a respective bogie suspension arm and corresponding shock absorber such that the bogie suspension arm is positioned between the adjustable shock mount and the chassis.

3. The lightweight mobile robot of claim 1 wherein the elastomer track is an injection molded, unitary component.

4. The lightweight mobile robot of claim 1 wherein the elastomer track is mounted with a tension between 1 and 10 pounds.

5. The lightweight mobile robot of claim 1 wherein the compliant shoe is manufactured from oil impregnated nylon.

6. The lightweight mobile robot of claim 1 wherein the shock absorber of each bogie assembly is preloaded according to a position of the bogie assembly along a length of the chassis relative to the drive wheel position.

7. The lightweight mobile robot of claim 6 wherein the shock absorber of the bogie assembly adjacent the drive wheel is the most stiff of the at least four bogie assemblies and the shock absorbers of the at least two bogie assemblies located centrally along the length of the chassis are the least stiff of the at least four bogie assemblies.

8. The lightweight mobile robot of claim 1 wherein the guide horn height is at least half a radial distance to a center of a road wheel.

9. The lightweight mobile robot of claim 1 wherein the guide horn height is about two thirds a radial distance to a center of a road wheel.

10. The lightweight mobile robot of claim 1 wherein the drive wheel has a diameter that is equal to or greater than half the height of the independent tracked drives.

11. The lightweight mobile robot of claim 1 wherein each bogie arm is swingable through a vertical range of at least about one third of the tracked drive height.

12. A compliant track suspension assembly for a mobile robot having a chassis and at least one tracked drive having a tracked drive height and a tracked drive length disposed on the chassis, the compliant track suspension assembly comprising:
  (a) four or more independently suspended bogie assemblies at a center bottom of the tracked drive, each bogie assembly including:
    (i) a road wheel, and
    (ii) a bogie suspension arm with the road wheel rotatably mounted at a distal end thereof, the bogie suspension arm swingable through a vertical range of more than one quarter to one half of the tracked drive height, the bogie suspension arm having a serpentine curvature that laterally spaces the corresponding road wheel apart from the chassis by a distance at least equal to a width of the road wheel, and
    (iii) a shock absorber mounted to independently compress the bogie suspension arm;
  (b) an idler wheel assembly at a front top of the tracked drive, the idler wheel assembly including:
    (i) an idler wheel, and
    (ii) a linearly translating idler wheel arm with the idler wheel rotatably mounted at a distal end thereof;
  (c) a compliant elastomer track entraining the road wheels and the idler wheel, wherein the elastomer track is mounted with a tension; and
  (d) a compliant front shoe fixedly coupled to a bogie suspension arm and shock absorber disposed at a front of the chassis and in communication with the road wheel adjacent the idler wheel, the compliant front shoe being disposed substantially equidistantly between the idler wheel and adjacent road wheel.

13. The compliant track suspension assembly of claim 12 wherein the mobile robot weighs less than 500 pounds.

14. The compliant track suspension assembly of claim 12, further comprising a drive wheel assembly at a rear top of the tracked drive entrained within the compliant elastomer track, the drive wheel assembly including:
  a drive wheel, and
  a drive motor for driving the drive wheel.

15. The compliant track suspension assembly of claim 14 wherein the compliant elastomer track further comprises two peripheral rows of raised drive features flanking a row of guide horns protruding from an inwardly facing track surface for matably engaging with the drive wheel, the road wheels and the idler wheel.

16. The compliant track suspension assembly of claim 15 wherein a height of the guide horns is greater than a height of the raised drive features by a factor of at least two.

17. The compliant track suspension assembly of claim 15 wherein the compliant front shoe is centered about the central guide horns.

18. The compliant track suspension assembly of claim 12 wherein an inflection point of the bogie suspension arm is positioned at a distance along a length of the suspension arm greater than a radius of the corresponding road wheel, the distance being measured from the distal end of the bogie suspension arm.

19. The compliant track suspension assembly of claim 12 wherein each bogie arm is swingable through a vertical range of at least about one third of the tracked drive height.

20. A lightweight mobile robot, comprising:
   (a) a chassis less than about 500 pounds; and
   (b) two independent tracked drives, one each disposed on an opposing side of the chassis, each tracked drive having a height and length, each tracked drive including:
      (i) a drive wheel assembly at a rear top portion of the tracked drive, the drive wheel assembly including:
         a drive wheel, and
         a drive motor for driving the drive wheel;
      (ii) four or more independently suspended bogie assemblies in a center bottom portion of the tracked drive, each bogie assembly including:
         a road wheel, and
         a bogie suspension arm with the road wheel rotatably mounted at a distal end thereof, the bogie arm swingable through a vertical range of at least one quarter of the tracked drive height, the bogie suspension arm having a serpentine curvature offsetting the corresponding road wheel outwardly from the chassis, thereby providing clearance for adjacent road wheels to swing past one another without making contact with any portion of the adjacent bogie assembly, and
         a shock absorber coupled to the bogie suspension arm to independently compress the bogie suspension arm;
      (iii) an idler wheel assembly at a front top portion of the tracked drive, the idler wheel assembly including:
         an idler wheel, and
         a linearly translating idler wheel arm with the idler wheel rotatably mounted at a distal end thereof;
      (iv) a compliant elastomeric track entraining the drive wheel, the road wheels, and the idler wheel and having two outer rows of raised drive features and a row of guide horns disposed between the outer rows of raised drive features, the raised drive features and the guide horns protruding from an inner track surface of the elastomeric track, the guide horns configured to matably engage the drive wheel, the road wheels and the idler wheel, wherein the elastomeric track is mounted with a tension; and
      (v) a compliant front shoe coupled to a bogie suspension arm and shock absorber disposed at a front of the chassis and in communication with the road wheel adjacent the idler wheel, the compliant front shoe having a slot configured to receive the central guide horns such that the front shoe is substantially centered about the central guide horns, wherein the front shoe is disposed between the idler wheel and adjacent road wheel.

* * * * *